US00RE48509E

(19) United States
(12) Reissued Patent
McClure et al.

(10) Patent Number: US RE48,509 E
(45) Date of Reissued Patent: *Apr. 13, 2021

(54) RASTER-BASED CONTOUR SWATHING FOR GUIDANCE AND VARIABLE-RATE CHEMICAL APPLICATION

(71) Applicant: AgJunction LLC, Hiawatha, KS (US)

(72) Inventors: John A. McClure, Scottsdale, AZ (US); Dennis M. Collins, Overgaard, AZ (US)

(73) Assignee: AGJUNCTION LLC, Scottsdale, AZ (US)

( * ) Notice: This patent is subject to a terminal disclaimer.

(21) Appl. No.: 16/053,650

(22) Filed: Aug. 2, 2018

Related U.S. Patent Documents

Reissue of:
(64) Patent No.: 8,718,874
Issued: May 6, 2014
Appl. No.: 13/776,512
Filed: Feb. 25, 2013

U.S. Applications:
(60) Division of application No. 15/147,689, filed on May 5, 2016, now Pat. No. Re. 47,055, which is an
(Continued)

(51) Int. Cl.
*A01B 69/00* (2006.01)
*B62D 6/00* (2006.01)
(Continued)

(52) U.S. Cl.
CPC ..... *A01B 69/008* (2013.01); *A01B 79/005* (2013.01); *G05D 1/027* (2013.01);
(Continued)

(58) Field of Classification Search
CPC ..... A01B 60/00–008; A01B 69/00–008
See application file for complete search history.

(56) References Cited

U.S. PATENT DOCUMENTS 3,586,537 A 6/1971 Rennick
3,596,228 A 7/1971 Reed, Jr.
(Continued)

FOREIGN PATENT DOCUMENTS

AU 2002244539 10/2002
AU 2002244539 B2 10/2002
(Continued)

OTHER PUBLICATIONS

Noh, Kwang-Mo, Self-tuning controller for farm tractor guidance, Iowa State University Retrospective Theses and Dissertations, Paper 9874, (1990).
(Continued)

*Primary Examiner* — Robert L Nasser
(74) *Attorney, Agent, or Firm* — Schwabe Williamson & Wyatt

(57) ABSTRACT

A raster-based system for global navigation satellite system (GNSS) guidance includes a vehicle-mounted GNSS antenna and receiver. A processor provides guidance and/or autosteering commands based on GNSS-defined pixels forming a grid representing an area to be treated, such as a field. Specific guidance and chemical application methods are provided based on the pixel-defined treatment areas and preprogrammed chemical application prescription maps, which can include variable chemical application rates and dynamic control of the individual nozzles of a sprayer.

14 Claims, 9 Drawing Sheets

Related U.S. Application Data application for the reissue of Pat. No. 8,718,874, which is a continuation of application No. 12/689,184, filed on Jan. 18, 2010, now Pat. No. 8,386,129.

(60) Provisional application No. 61/145,542, filed on Jan. 17, 2009.

(51) Int. Cl.
*A01B 69/04* (2006.01)
*A01B 79/00* (2006.01)
*G05D 1/02* (2020.01)

(52) U.S. Cl.
CPC ..... *G05D 1/0274* (2013.01); *G05D 1/0278* (2013.01); *G05D 2201/0201* (2013.01)

(56) References Cited

U.S. PATENT DOCUMENTS 3,727,710 A 4/1973 Sanders
3,815,272 A 6/1974 Marleau
3,899,028 A 8/1975 Morris
3,987,456 A 10/1976 Gelin
4,132,272 A 1/1979 Holloway
4,170,776 A 10/1979 MacDoran
4,180,133 A 12/1979 Collogan
4,398,162 A 8/1983 Nagai
4,453,614 A 6/1984 Allen
4,529,990 A 7/1985 Brunner
4,637,474 A 1/1987 Leonard
4,667,203 A 5/1987 Counselman, III
4,689,556 A 8/1987 Cedrone
4,694,264 A 9/1987 Owens
4,710,775 A 12/1987 Coe
4,714,435 A 12/1987 Stipanuk
4,739,448 A 4/1988 Rowe
4,751,512 A 6/1988 Longaker
4,769,700 A 9/1988 Pryor
4,785,463 A 11/1988 Janc
4,802,545 A 2/1989 Nystuen
4,812,991 A 3/1989 Hatch
4,813,991 A 3/1989 Hale
4,858,132 A 8/1989 Holmquist
4,864,320 A 9/1989 Munson
4,894,662 A 1/1990 Counselman
4,916,577 A 4/1990 Dawkins
4,918,607 A 4/1990 Wible
4,963,889 A 10/1990 Hatch
5,031,704 A 7/1991 Fleischer
5,100,229 A 3/1992 Lundberg
5,134,407 A 7/1992 Lorenz
5,148,179 A 9/1992 Allison
5,152,347 A 10/1992 Miller
5,155,490 A 10/1992 Spradley
5,155,493 A 10/1992 Thursby
5,156,219 A 10/1992 Schmidt
5,165,109 A 11/1992 Han
5,173,715 A 12/1992 Rodal
5,177,489 A 1/1993 Hatch
5,185,610 A 2/1993 Ward
5,191,351 A 3/1993 Hofer
5,194,851 A 3/1993 Kraning et al.
5,202,829 A 4/1993 Geier
5,207,239 A 5/1993 Schwitalia
5,239,669 A 8/1993 Mason
5,255,756 A 10/1993 Follmer
5,268,695 A 12/1993 Dentinger
5,293,170 A 3/1994 Lorenz
5,294,970 A 3/1994 Dornbusch
5,296,861 A 3/1994 Knight
5,311,149 A 5/1994 Wagner
5,323,322 A 6/1994 Mueller
5,334,987 A 8/1994 Teach
5,343,209 A 8/1994 Sennott
5,345,245 A 9/1994 Ishikawa
5,359,332 A 10/1994 Allison
5,361,212 A 11/1994 Class
5,365,447 A 11/1994 Dennis
5,369,589 A 11/1994 Steiner
5,375,059 A 12/1994 Kyrtsos
5,390,124 A 2/1995 Kyrtsos
5,390,125 A 2/1995 Sennott
5,390,207 A 2/1995 Fenton
5,416,712 A 5/1995 Geier
5,430,654 A 7/1995 Kyrtsos et al.
5,442,363 A 8/1995 Remondi
5,444,453 A 8/1995 Lalezari
5,451,964 A 9/1995 Babu
5,467,282 A 11/1995 Dennis
5,471,217 A 11/1995 Hatch
5,476,147 A 12/1995 Fixemer
5,477,228 A 12/1995 Tiwari
5,477,458 A 12/1995 Loomis
5,490,073 A 2/1996 Kyrtsos
5,491,636 A 2/1996 Robertson
5,495,257 A 2/1996 Loomis
5,504,482 A 4/1996 Schreder
5,511,623 A 4/1996 Fraiser
5,519,620 A 5/1996 Talbot
5,521,610 A 5/1996 Rodal
5,523,761 A 6/1996 Gildea
5,534,875 A 7/1996 Diefes
5,543,804 A 8/1996 Buchler
5,546,093 A 8/1996 Gudat
5,548,293 A 8/1996 Cohen
5,561,432 A 10/1996 Knight
5,563,786 A 10/1996 Torii
5,568,152 A 10/1996 Janky
5,568,162 A 10/1996 Samsel
5,583,513 A 12/1996 Cohen
5,589,835 A 12/1996 Gildea
5,592,382 A 1/1997 Colley
5,596,328 A 1/1997 Stangeland
5,600,670 A 2/1997 Turney
5,604,506 A 2/1997 Rodal
5,608,393 A 3/1997 Hartman
5,610,522 A 3/1997 Locatelii
5,610,616 A 3/1997 Vallot
5,610,845 A 3/1997 Slabinski
5,612,883 A 3/1997 Shaffer
5,615,116 A 3/1997 Gudat
5,617,100 A 4/1997 Akiyoshi
5,617,317 A 4/1997 Ignagni
5,621,646 A 4/1997 Enge
5,631,658 A 5/1997 Gudat et al.
5,638,077 A 6/1997 Martin
5,644,138 A 7/1997 Allen
5,646,844 A 7/1997 Gudat et al.
5,663,879 A 9/1997 Trovato et al.
5,664,632 A 9/1997 Fraiser
5,673,491 A 10/1997 Brenna
5,680,140 A 10/1997 Loomis
5,684,476 A 11/1997 Anderson
5,684,696 A 11/1997 Rao
5,706,015 A 1/1998 Chen
5,717,593 A 2/1998 Gvili
5,725,230 A 3/1998 Walkup
5,731,786 A 3/1998 Abraham
5,739,785 A 4/1998 Allison
5,757,316 A 5/1998 Buchler
5,765,123 A 6/1998 Nimura
5,777,578 A 6/1998 Chang
5,810,095 A 7/1998 Orbach
5,828,336 A 10/1998 Yunck
5,838,562 A 11/1998 Gudat
5,854,987 A 12/1998 Sekine
5,862,501 A 1/1999 Talbot
5,864,315 A 1/1999 Welles
5,864,318 A 1/1999 Cozenza
5,875,408 A 2/1999 Bendett
5,877,725 A 3/1999 Kalafus
5,890,091 A 3/1999 Talbot
5,899,957 A 5/1999 Loomis
5,906,645 A 5/1999 Kagawa

(56) References Cited

U.S. PATENT DOCUMENTS 5,912,798 A 6/1999 Chu
5,914,685 A 6/1999 Kozlov
5,917,448 A 6/1999 Mickelson
5,918,558 A 7/1999 Susag
5,919,242 A 7/1999 Greatline
5,923,270 A 7/1999 Sampo
5,926,079 A 7/1999 Heine
5,927,603 A 7/1999 McNabb
5,928,309 A * 7/1999 Korver ..... G01C 21/165 342/359
5,929,721 A 7/1999 Munn
5,933,110 A 8/1999 Tang
5,935,183 A 8/1999 Sahm
5,936,573 A 8/1999 Smith
5,940,026 A 8/1999 Popeck
5,941,317 A 8/1999 Mansur
5,943,008 A 8/1999 Van Dusseldorp
5,944,770 A 8/1999 Enge
5,945,917 A 8/1999 Harry
5,949,371 A 9/1999 Nichols
5,955,973 A 9/1999 Anderson
5,956,250 A 9/1999 Gudat
5,969,670 A 10/1999 Kalafus
5,987,383 A 11/1999 Keller
6,014,101 A 1/2000 Loomis
6,014,608 A 1/2000 Seo
6,018,313 A 1/2000 Engelmayer
6,023,239 A 2/2000 Kovach
6,052,647 A 4/2000 Parkinson
6,055,477 A 4/2000 McBurney
6,057,800 A 5/2000 Yang
6,061,390 A 5/2000 Meehan
6,061,632 A 5/2000 Dreier
6,062,317 A 5/2000 Gharsalli
6,069,583 A 5/2000 Silvestrin
6,070,673 A 6/2000 Wendte
6,073,070 A 6/2000 Diekhans
6,076,612 A 6/2000 Carr
6,081,171 A 6/2000 Ella
6,100,842 A 8/2000 Dreier
6,122,595 A 9/2000 Valery
6,128,574 A 10/2000 Diekhans
6,144,335 A 11/2000 Rogers
6,191,730 B1 2/2001 Nelson, Jr.
6,191,733 B1 2/2001 Dizchavez
6,198,430 B1 3/2001 Hwang
6,198,992 B1 3/2001 Winslow
6,199,000 B1 3/2001 Keller
6,205,401 B1 3/2001 Pickhard
6,212,453 B1 4/2001 Kawagoe et al.
6,215,828 B1 4/2001 Signell
6,229,479 B1 5/2001 Kozlov
6,230,097 B1 5/2001 Dance
6,233,511 B1 5/2001 Berger
6,236,916 B1 5/2001 Staub
6,236,924 B1 5/2001 Motz
6,253,160 B1 6/2001 Hanseder
6,256,583 B1 7/2001 Sutton
6,259,398 B1 7/2001 Riley
6,266,595 B1 * 7/2001 Greatline ..... A01B 79/005 340/990
6,285,320 B1 9/2001 Olster
6,292,132 B1 9/2001 Wilson
6,307,505 B1 10/2001 Green
6,313,788 B1 11/2001 Wilson
6,314,348 B1 11/2001 Winslow
6,325,684 B1 12/2001 Knight
6,336,051 B1 1/2002 Pangels
6,336,066 B1 1/2002 Pellenc
6,345,231 B2 2/2002 Quincke
6,356,602 B1 3/2002 Rodal
6,373,432 B1 4/2002 Rabinowitz et al.
6,377,889 B1 4/2002 Soest
6,380,888 B1 4/2002 Kucik
6,389,345 B2 5/2002 Phelps
6,392,589 B1 5/2002 Rogers
6,397,147 B1 5/2002 Whitehead
6,415,229 B1 7/2002 Diekhans
6,418,031 B1 7/2002 Archambeault
6,421,003 B1 7/2002 Riley
6,424,915 B1 7/2002 Fukuda
6,431,576 B1 8/2002 Viaud
6,434,462 B1 8/2002 Bevly
6,445,983 B1 9/2002 Dickson
6,445,990 B1 9/2002 Manring
6,449,558 B1 9/2002 Small
6,463,091 B1 10/2002 Zhodzicshsky
6,463,374 B1 10/2002 Keller
6,466,871 B1 10/2002 Reisman
6,469,663 B1 10/2002 Whitehead
6,484,097 B2 11/2002 Fuchs
6,501,422 B1 * 12/2002 Nichols ..... G01S 19/14 342/357.36
6,515,619 B1 2/2003 McKay, Jr.
6,516,271 B2 2/2003 Upadhyaya
6,539,303 B2 3/2003 McClure
6,542,077 B2 4/2003 Joao
6,549,835 B2 4/2003 Deguchi
6,553,299 B1 4/2003 Keller
6,553,300 B2 4/2003 Ma
6,553,311 B2 4/2003 Ahearn
6,570,534 B2 5/2003 Cohen
6,577,952 B2 6/2003 Geier
6,587,761 B2 7/2003 Kumar
6,606,542 B2 8/2003 Hauwiller
6,611,228 B2 8/2003 Toda
6,611,754 B2 8/2003 Klein
6,611,755 B1 8/2003 Coffee
6,622,091 B2 9/2003 Perlmutter
6,631,916 B1 10/2003 Miller
6,643,576 B1 11/2003 O'Connor
6,646,603 B2 11/2003 Dooley
6,657,875 B1 12/2003 Zeng
6,671,587 B2 12/2003 Hrovat
6,688,403 B2 2/2004 Bernhardt
6,703,973 B1 3/2004 Nichols
6,711,501 B2 3/2004 McClure
6,721,638 B2 4/2004 Zeitler
6,732,024 B2 5/2004 Rekow
6,744,404 B1 6/2004 Whitehead
6,754,584 B2 6/2004 Pinto
6,774,843 B2 8/2004 Takahashi
6,789,014 B1 9/2004 Rekow et al.
6,792,380 B2 9/2004 Toda
6,804,587 B1 10/2004 O Connor et al.
6,819,269 B2 11/2004 Flick
6,819,780 B2 11/2004 Benson et al.
6,822,314 B2 11/2004 Beasom
6,865,465 B2 3/2005 McClure
6,865,484 B2 3/2005 Miyasaka
6,900,992 B2 3/2005 Kelly
6,876,920 B1 4/2005 Mailer
6,922,635 B2 7/2005 Rorabaugh
6,931,233 B1 8/2005 Tso
6,967,538 B2 11/2005 Woo
6,990,399 B2 1/2006 Hrazdera
7,006,032 B2 2/2006 King
7,026,982 B2 4/2006 Toda
7,027,918 B2 4/2006 Zimmerman
7,031,725 B2 4/2006 Rorabaugh
7,089,099 B2 8/2006 Shostak
7,142,956 B2 11/2006 Heiniger
7,162,348 B2 * 1/2007 McClure ..... A01B 69/004 280/456.1
7,191,061 B2 3/2007 McKay
7,231,290 B2 6/2007 Steichen
7,248,211 B2 7/2007 Hatch
7,271,766 B2 9/2007 Zimmerman
7,277,784 B2 10/2007 Weiss
7,277,792 B2 10/2007 Overschie
7,292,186 B2 11/2007 Miller
7,324,915 B2 1/2008 Altman
7,358,896 B2 4/2008 Gradincic
7,373,231 B2 5/2008 McClure

(56) References Cited

U.S. PATENT DOCUMENTS 7,388,539 B2 6/2008 Whitehead
7,395,769 B2 7/2008 Jensen
7,400,956 B1 * 7/2008 Feller ..... A01B 69/008 342/357.36
7,428,259 B2 9/2008 Wang
7,437,230 B2 10/2008 McClure
7,451,030 B2 11/2008 Eglington
7,460,942 B2 12/2008 Mailer
7,479,900 B2 1/2009 Horstemeyer
7,505,848 B2 3/2009 Flann
7,522,100 B2 4/2009 Yang
7,571,029 B2 8/2009 Dai
7,623,952 B2 11/2009 Unruh et al.
7,689,354 B2 3/2010 Heiniger
RE41,358 E 5/2010 Heiniger et al.
7,835,832 B2 11/2010 Macdonald et al.
7,885,745 B2 2/2011 McClure et al.
8,018,376 B2 9/2011 McClure et al.
8,140,223 B2 3/2012 Whitehead et al.
8,190,337 B2 5/2012 McClure
8,214,111 B2 7/2012 Heiniger et al.
8,265,826 B2 9/2012 Feller et al.
8,311,696 B2 11/2012 Reeve
8,386,129 B2 2/2013 Collins
8,401,704 B2 3/2013 Pollock et al.
8,437,901 B2 5/2013 Anderson
8,489,291 B2 7/2013 Dearborn et al.
8,521,372 B2 8/2013 Hunt et al.
8,548,649 B2 10/2013 Guyette et al.
8,583,315 B2 11/2013 Whitehead et al.
8,583,326 B2 11/2013 Collins et al.
8,589,013 B2 11/2013 Pieper et al.
8,594,879 B2 11/2013 Roberge et al.
8,634,993 B2 1/2014 McClure et al.
8,639,416 B2 1/2014 Jones et al.
8,649,930 B2 2/2014 Reeve et al.
8,676,620 B2 3/2014 Hunt et al.
8,718,874 B2 5/2014 McClure
8,768,558 B2 7/2014 Reeve et al.
8,781,685 B2 7/2014 McClure
8,803,735 B2 8/2014 McClure
8,897,973 B2 11/2014 Hunt et al.
8,924,152 B2 12/2014 Hunt et al.
9,002,565 B2 4/2015 Jones et al.
9,002,566 B2 4/2015 McClure et al.
9,141,111 B2 9/2015 Webber et al.
9,162,703 B2 10/2015 Miller et al.
9,173,337 B2 11/2015 Guyette et al.
9,223,314 B2 12/2015 McClure et al.
9,255,992 B2 2/2016 McClure
9,389,615 B2 7/2016 Webber et al.
2002/0072850 A1 6/2002 McClure et al.
2002/0107609 A1 8/2002 Benneweis
2003/0014171 A1 1/2003 Ma
2003/0187560 A1 10/2003 Keller et al.
2003/0187577 A1 10/2003 McClure
2003/0208311 A1 * 11/2003 McClure ..... G01S 19/41 701/50
2003/0208319 A1 11/2003 Ell
2004/0039514 A1 2/2004 Steichen
2004/0186644 A1 9/2004 McClure et al.
2004/0212533 A1 10/2004 Whitehead
2005/0080559 A1 4/2005 Ishibashi
2005/0225955 A1 10/2005 Grebenkemper
2005/0265494 A1 12/2005 Goodlings
2006/0167600 A1 7/2006 Nelson
2006/0178825 A1 8/2006 Eglington
2006/0215739 A1 9/2006 Williamson
2007/0021913 A1 * 1/2007 Heiniger et al. ..... A01B 69/008 701/412
2007/0078570 A1 4/2007 Dai
2007/0088447 A1 4/2007 Stothert
2007/0121708 A1 5/2007 Simpson
2007/0205940 A1 9/2007 Yang
2007/0285308 A1 12/2007 Bauregger
2008/0059889 A1 * 3/2008 Parker ..... G06F 16/29 715/748
2008/0103690 A1 * 5/2008 Dix ..... A01B 69/008 701/516
2008/0129586 A1 6/2008 Martin
2008/0195268 A1 8/2008 Sapilewski et al.
2008/0204312 A1 8/2008 Euler
2009/0099730 A1 * 4/2009 McClure ..... A01B 69/008 701/41
2009/0099737 A1 * 4/2009 Wendte et al. ..... 701/50
2009/0121932 A1 5/2009 Whitehead et al.
2009/0171583 A1 7/2009 DiEsposti
2009/0174597 A1 7/2009 DiLellio
2009/0174622 A1 7/2009 Kanou
2009/0177395 A1 7/2009 Stelpstra
2009/0177399 A1 7/2009 Park
2009/0259397 A1 10/2009 Stanton
2009/0259707 A1 10/2009 Martin
2009/0262014 A1 10/2009 DiEsposti
2009/0262018 A1 10/2009 Vasilyev
2009/0262974 A1 10/2009 Lithopoulos
2009/0265054 A1 10/2009 Basnayake
2009/0265101 A1 10/2009 Jow
2009/0265104 A1 10/2009 Shroff
2009/0273372 A1 11/2009 Brenner
2009/0273513 A1 11/2009 Huang
2009/0274079 A1 11/2009 Bhatia
2009/0274113 A1 11/2009 Katz
2009/0276155 A1 11/2009 Jeergage
2009/0295633 A1 12/2009 Pinto
2009/0295634 A1 12/2009 Yu
2009/0299550 A1 12/2009 Baker
2009/0322597 A1 12/2009 Medina Herrero
2009/0322598 A1 12/2009 Fly
2009/0322600 A1 12/2009 Whitehead
2009/0322601 A1 12/2009 Ladd
2009/0322606 A1 12/2009 Gronemeyer
2009/0326809 A1 12/2009 Colley
2010/0013703 A1 1/2010 Tekawy
2010/0026569 A1 2/2010 Amidi
2010/0030470 A1 2/2010 Wang
2010/0039316 A1 2/2010 Gronemeyer
2010/0039318 A1 2/2010 Kmiecik
2010/0039320 A1 2/2010 Boyer
2010/0039321 A1 2/2010 Abraham
2010/0060518 A1 3/2010 Bar-Sever
2010/0063649 A1 3/2010 Wu
2010/0084147 A1 4/2010 Aral
2010/0085249 A1 4/2010 Ferguson
2010/0085253 A1 4/2010 Ferguson
2010/0103033 A1 4/2010 Roh
2010/0103034 A1 4/2010 Tobe
2010/0103038 A1 4/2010 Yeh
2010/0103040 A1 4/2010 Broadbent
2010/0106414 A1 4/2010 Whitehead
2010/0106445 A1 4/2010 Kondoh
2010/0109944 A1 5/2010 Whitehead
2010/0109945 A1 5/2010 Roh
2010/0109947 A1 5/2010 Rintanen
2010/0109948 A1 5/2010 Razoumouv
2010/0109950 A1 5/2010 Roh
2010/0111372 A1 5/2010 Zheng
2010/0114483 A1 5/2010 Heo
2010/0117894 A1 5/2010 Velde
2010/0185364 A1 7/2010 Collins
2010/0274452 A1 10/2010 Ringwald et al.
2010/0312428 A1 12/2010 Roberge et al.
2011/0015817 A1 1/2011 Reeve
2011/0018765 A1 1/2011 Whitehead et al.
2011/0054729 A1 3/2011 Whitehead et al.
2011/0270495 A1 11/2011 Knapp
2012/0174445 A1 7/2012 Jones et al.
2013/0179026 A1 7/2013 McClure et al.
2014/0266877 A1 9/2014 McClure
2014/0277676 A1 9/2014 Gattis
2015/0175194 A1 6/2015 Gattis
2016/0039454 A1 2/2016 Mortimer
2016/0154108 A1 6/2016 McClure et al.
2016/0205864 A1 7/2016 Gattis et al.

(56) References Cited

U.S. PATENT DOCUMENTS

| | | | |
|---|---|---|---|
| 2016/0214643 | A1 | 7/2016 | Joughin et al. |
| 2016/0252909 | A1 | 9/2016 | Webber et al. |
| 2016/0334804 | A1 | 11/2016 | Webber et al. |

FOREIGN PATENT DOCUMENTS

| | | | |
|---|---|---|---|
| AU | 2002325645 | B2 | 3/2003 |
| AU | 2002325645 | | 9/2007 |
| JP | 07244150 | | 9/1995 |
| WO | 09836288 | B2 | 8/1998 |
| WO | 2000024239 | A1 | 5/2000 |
| WO | 2003019430 | A1 | 3/2003 |
| WO | 2005119386 | A1 | 12/2005 |
| WO | 2008080193 | A1 | 7/2008 |
| WO | WO-2008080193 | | 7/2008 |
| WO | 2009066183 | A2 | 5/2009 |
| WO | 2009126587 | A1 | 10/2009 |
| WO | 2009148638 | A1 | 12/2009 |
| WO | 2010005945 | A1 | 1/2010 |
| WO | WO-2010005945 | | 1/2010 |

OTHER PUBLICATIONS

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

ARINC Engineering Services, Interface Specification IS-GPS-200, Revision D, Online [retrieved on May 18, 2010]. Retrieved from the Internet: <http://www.navcen.uscg.gov/gps/geninfo/IS-GPS-200D.pdf> Dec. 7, 2004; p. 168, para (0001].

"Eurocontrol, Pegasus Technical Notes on SBAS", report [online], Dec. 7, 2004 [retrieved on May 18, 2010]. Retrieved from the Internet: <http://www. icao. i nt/icao/ en/ ro/ nacc/ meeti ngs/2004/ gnss/ documenta tion/Pegasus/tn.pdf> Dec. 7, 2004; p. 89, paras (0001)-(0004].

"ISO", 11783 Part 7 Draft Amendment 1 Annex, Paragraphs B.6 and B.7 ISO 11783-7 2004 DAMI, ISO; Mar. 8, 2004.

"Orthman Manufacturing Co., www.orthman.com/htm;guidance.htm", 2004, regarding the "Tracer Quick-Hitch.".

Bevly, David M., "Comparison of INS v. Carrier-Phase DGPS for Attitude Determination in the Control of Off-Road Vehicles"; Ion 55th Annual Meeting; Jun. 28-30, 1999; Cambridge, Mass; p. 497-504.

Han, Shaowel et al., "Single-Epoch Ambiguity Resolution for Real-Time GPS Attitude Determination with the Aid of One-Dimensional Optical Fiber Gyro". GPS Solutions, vol. 3, No. 1; pp. 5-12 (1999); John Wiley & Sons, Inc.

International Search Report and Written Opinion for PCT/1B2008/003796 dated Jul. 15, 2009.

International Search Report and Written Opinion for PCT/US2004/015678 dated Jun. 21, 2005.

International Search Report and Written Opinion for PCT/US2009/063594 dated Jan. 11, 2010.

International Search Report and Written Opinion for PCT /US2010/021334 dated Mar. 12, 2010.

International Search Report for PCT/ AU2008/000002 dated Feb. 28, 2008.

International Search Report for PCT/US2009/033567 dated Feb. 9, 2009.

International Search Report for PCT /US2009/033693 dated Mar. 30, 2009.

International Search Report for PCT/US2009/039686 dated May 26, 2009.

International Search Report for PCT /U52009/049776 dated Aug. 11, 2009.

International Search Report for PCT/US2009/060668 dated Dec. 9, 2009.

International Search Report for PCT /US2009/067693 dated Jan. 26, 2010.

International Search Report for PCT /US2010/026509 dated Apr. 20, 2010.

International Search Report for PCT/US209/034376 dated Nov. 2, 2009.

Irsigler, M. et al., "PPL Tracking Performance in the Presence of Oscillator Phase Noise", GPS Solutions, vol. 5, No. 4; pp. 45-57; 2002.

Kaplan, E.D. "Understanding GPS: Principles and Applications"; Artech House, MA; 1996.

Keicher, R. et al. "Automatic Guidance for Agricultural Vehicles in Europe", Computers and Electronics in Agriculture, vol. 25, Jan. 2000; pp. 169-194.

Last, J.D. et al., "Effect of skyware interference on coverage of radio beacon stations", IEEE Proc.—Radar, Sonar Navig., vol. 14, No. 3; Jun. 1997; pp. 163-168.

Lin, Dai et al., "Real-time Attitude Determination for Microsatellite by Lamda Method Combined with Kalman Filtering", a collection of the 22nd AIAA International Communications Satellite Systems Conference and Exhibit Technical Papers vol. 1, Monterey, CA, American Institute of Aeronautics and Astronautics, Inc.; May 2004; 136-143.

Park, Chansik et al., "Integer Ambiguity Resolution for GPS Based Attitude Determination System", SICE Jul. 29-31, 1998, Shiba, 1115-1120.

Parkinson, Bradford W., et al., "Global Positioning System: Theory and Applications, vol. 11"; Bradford W. Parkinson and James J. Spiker, Jr., eds., Global Positioning System: Theory and Applications, vol. II: 1995, AIAA, Reston, VA, USA; pp. 3-50; (1995), 3-50.

Rho, Hyundho et al., "Dual-Frequency GPS Precise Point Positioning with WADGPS Corrrections", [retrieved on May 18, 2010). Retrieved from the Internet: <http://gauss.gge.unb.ca/papers.pdf/iongnss2005.rho. wadgps.pdf> Jul. 12, 2006.

Schaer, et al., "Determination and Use of GPS Differential Code Bias Values", Presentation [online]. Retrieved on May 18, 2010. Retrieved from the Internet: <http://nng/esoc.esa.de/ws2006/REPR2.pdf> May 8, 2006.

Takac, Frank et al., "SmartRTK: A Novel Method of Processing Standardized RTCM Network RTK information for High Precision Positioning"; Proceedings of ENC GNSS 2008, Toulouse, France; Apr. 22, 2008.

Ward, Phillip, W., "Performance Comparisons Between FLL, PLL and a Novel FLL-Assisted-PLL Carrier Tracking Loop Under RF Interference Conditions", 11th Int. Tech Meeting of the Satellite Division of the US Inst. Of Navigation, Nashville, TN; Sep. 15018, 1998; p. 783-795.

Xu, Jiangning et al., "An EHW Architecture for Real-Time GPS Attitude Determination Based on Parallel Genetic Algorithm", The Computer Society Proceedings of the 2002 NASA/DOD Conference on Evolvable Hardware (EH '02)(2002).

* cited by examiner

RASTER-BASED CONTOUR SWATHING FOR GUIDANCE AND VARIABLE-RATE CHEMICAL APPLICATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is] *The present application is a second reissue application of U.S. Pat. No. 8,718,874 filed as U.S. patent application Ser. No. 13/776,512 on Feb. 25, 2013. The present application is a divisional of U.S. patent application Ser. No. 15/147,689, filed May 5, 2016, now U.S. Pat. No. RE47,055, issued Sep. 25, 2018, which is a reissue of U.S. patent application Ser. No. 13/776,512, filed Feb. 25, 2013, now U.S. Pat. No. 8,718,874, issued May 6, 2014, which is* a continuation of and claims priority in U.S. patent application Ser. No. 12/689,184, filed Jan. 18, 2010, now U.S. Pat. No. 8,386,129, issued Feb. 26, 2013, which claims priority in U.S. Provisional Patent Application Ser. No. 61/145,542, filed Jan. 17, 2009, [both of] which are incorporated herein by reference.

BACKGROUND OF THE INVENTION

1. Field of the Invention

The present invention relates generally to automated equipment control using a raster-based database, including vehicle navigation and guidance using global navigation satellite system (GNSS), inertial navigation system (INS) and other positioning inputs, and machine control functions such as variable-rate chemical applications in agricultural spraying.

2. Description of the Related Art

GNSS technology advanced vehicle and machine guidance and control in various technical fields, including the field of agricultural guidance by enabling reliable, accurate systems, which are relatively easy to use. GNSS guidance systems are adapted for displaying directional guidance information to assist operators with manually steering the vehicles. For example, the OUTBACK® steering guidance system, which is available from Hemisphere GPS LLC of Calgary, Alberta, Canada and is covered by U.S. Pat. Nos. 6,539,303 and 6,711,501 (incorporated herein by reference), includes an on-board computer capable of storing various straight-line and curved ("contour") patterns. An advantage of this system is its ability to retain field-specific cultivating, planting, spraying, fertilizing, harvesting and other patterns in memory. This feature enables operators to accurately retrace such patterns. Another advantage relates to the ability to interrupt operations for subsequent resumption by referring to system-generated logs of previously treated areas. The OUTBACK S steering guidance system, and related product offerings from Hemisphere GPS LLC, utilize "near point search method" technology, which logs GPS-defined positions along swath edges, the nearest of which are located for placing the edge of the next swath against the last.

Another type of GPS guidance utilizes "form line following," wherein vectors, which can be straight-line (A-B) or curved (contour), are computed based on equipment widths offset from the previously-driven form lines. A disadvantage with this type of system is that initial form lines must be driven and delineated based upon which subsequent form lines must be computed and followed. Significant computer overhead can be occupied with such tasks, whereby trade-offs are required between component costs and system responsiveness.

GNSS vehicle guidance equipment using the above techniques is available as a steering guide with a graphical user interface (GUI) for manually-steered vehicles, and also with an autosteer function for automatically steering the vehicle along all or part of its travel path. Automated systems can also control an agricultural procedure or operation, such as spraying, planting, tilling, harvesting, etc. Examples of such equipment are shown in U.S. Pat. No. 7,142,956, which is incorporated herein by reference. U.S. Patent Application Publication No. 2004/0186644 shows satellite-based vehicle guidance control in straight and contour modes, and is also incorporated herein by reference. U.S. Pat. No. 7,162,348 is incorporated herein by reference and discloses an articulated equipment position control system and method whereby a working component, such as an implement, can be guided independently of a motive component, such as a tractor. The implement can optionally be equipped with its own GNSS antenna and/or receiver for interacting with a tractor-mounted GNSS system.

Ideally crops would be planted in perfectly straight, evenly-spaced rows. Guidance through such fields would consist of following relatively simple straight-line patterns. Such guidance modes are commonly referred to as straight line or "A-B" in reference to the equipment traveling in a straight line from point A to point B in a repeating pattern in order to cover an entire field, which is typically flat and rectangular and therefore efficiently divided into multiple, parallel swaths. However, field conditions in many areas are not suitable for A-B guidance. For example, hilly terrain sometimes requires the formation of constant-elevation terraces.

Guidance systems accommodate such irregular conditions by operating in "contour following" modes consisting of curvilinear tracks defined by multiple GNSS points along which the equipment is guided. Initial planting passes made with manual and visually-guided navigation, which may or may not be supplemented with GNSS navigational aids, can cause crop rows to deviate from straight lines. Accommodating such irregular crop rows in subsequent operations (e.g., spraying and harvesting) may require the equipment to deviate from straight-line passes.

"Tramline" (sometimes referred to as "match tracks") is another operating mode available with some modern GNSS guidance systems. In tramline operating mode the existing crop rows are relatively well protected because the equipment follows or "matches" the previously-driven passes. The equipment wheels or tracks are thus confined between the crop rows. Machine damage from running over crops is thus avoided, or at least minimized.

Preferably a system embodying an aspect of the present invention would avoid the drawbacks inherent in the previous systems described above and be adaptable to various machine control applications, including variably controlling the output of individual nozzles in agricultural sprayers. In particular, raster (e.g., bitmap) data bases can be used with previously-defined world geodetic systems, such as WGS 84, thereby eliminating overhead-intensive tasks such as continuously running extensive searches for points along the edges of previously-driven swaths or computing form lines.

Heretofore there has not been available a raster-based contour swathing system and method with the advantages and features of the present invention.

SUMMARY OF THE INVENTION

In the practice of the present invention, a system and method are provided for automatically guiding and controlling vehicles and equipment using GNSS for defining a raster-based database of pixels defining either an entire area to be treated, or a subset through which a vehicle travels. For example, agricultural equipment comprising a tractor and an implement can be equipped with a vector position and heading sensor subsystem including a GNSS receiver and antennas and an optional inertial navigational system (INS) with X, Y and Z axis sensors for sensing equipment attitude changes through six degrees of freedom. Such sensors typically comprise gyroscopes and/or accelerometers. A 2D map array comprises an XY grid of pixels, which is scalable according to the requirements of a particular operation. Guidance operations are accomplished by marking pixels as "applied" when treated on an equipment pass. Subsequent passes can guide off of the applied pixel areas, using "target" aim point pixels and/or swath-width spacing to one side or the other of the applied areas. Moreover, machine control functions can actuate certain operations based on equipment position. For example, spray nozzles on a sprayer implement can be selectively and individually actuated over areas to be sprayed.

DETAILED DESCRIPTION OF THE PREFERRED EMBODIMENTS

I. Introduction and Environment

Figure 1:
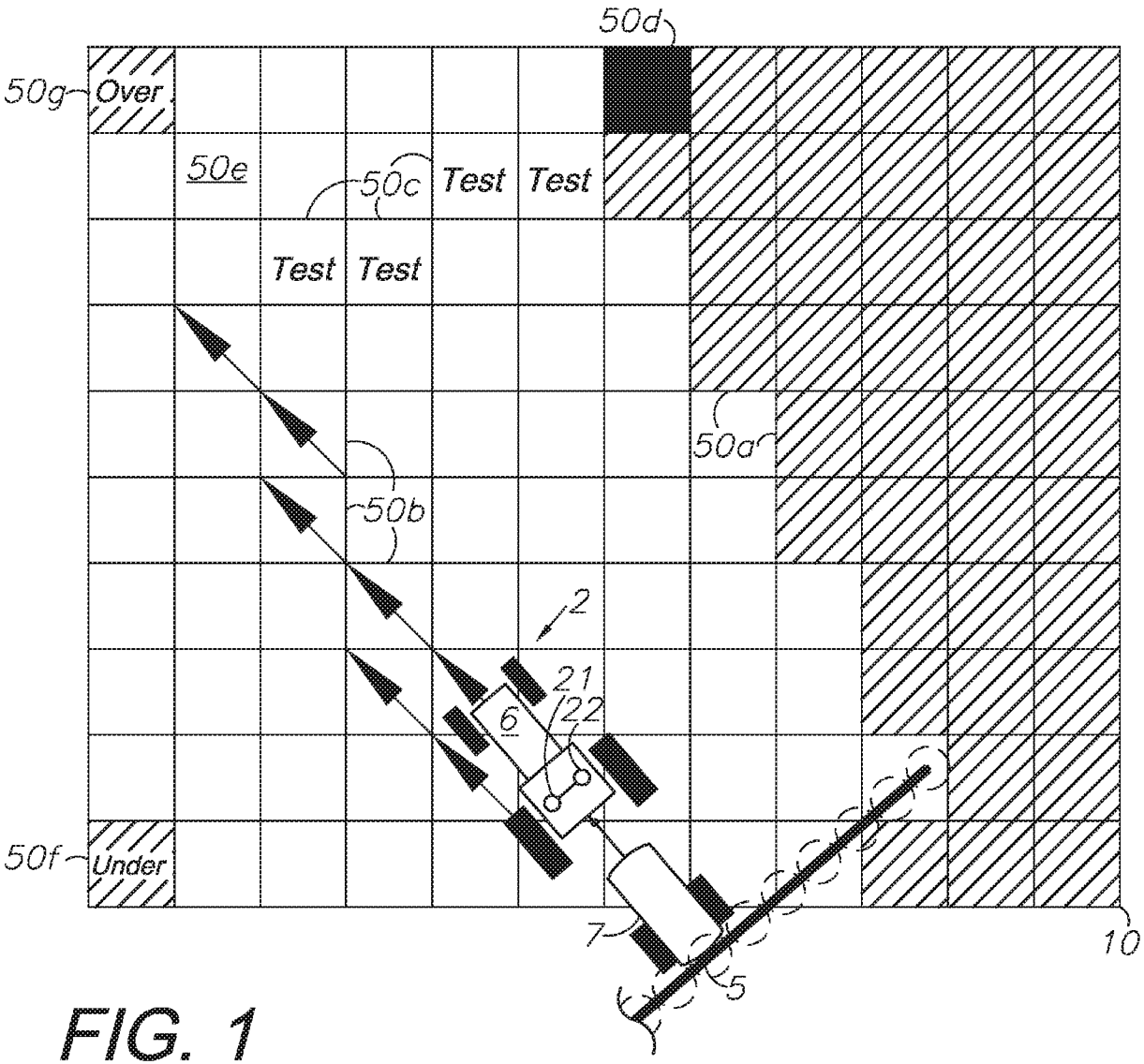
FIG. 1 is a plan view of agricultural equipment equipped with GNSS and (optionally) INS guidance and control systems, shown in operation on a field defined by an XY array of pixels.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof Global navigation satellite systems (GNSS) are broadly defined to include GPS (U.S.), Galileo (proposed), GLONASS (Russia), Beidou (China), Compass (proposed), IRNSS (India, proposed), QZSS (Japan, proposed) and other current and future positioning technology using signals from satellites, using single or multiple antennae, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

II. Guidance and Control System 4

Referring to the drawings in more detail, the reference numeral 2 generally designates a piece of agricultural equipment, which is equipped with a raster-based guidance and control system 4 embodying an aspect of the present invention. Without limitation on the generality of equipment 2, a motive component 6 is connected to a working component 7 through an optional articulated connection or hitch 34 (collectively comprising the equipment or vehicle 2). Also by way of example, the motive component 6 can comprise a tractor or other vehicle and the working component 7 can comprise a ground-working implement. However, the system 4 can be applied to other equipment configurations for a wide range of other applications. Such applications include equipment and components used in road construction, road maintenance, earthworking, mining, transportation, industry, manufacturing, logistics, etc.

FIG. 1 shows the equipment 2 operating on a portion of a field 10 with an array of XY pixels 50, which are used for providing guidance and controlling the operation of the implement 7, which can comprise a sprayer with individual nozzles 8.

Figure 2:
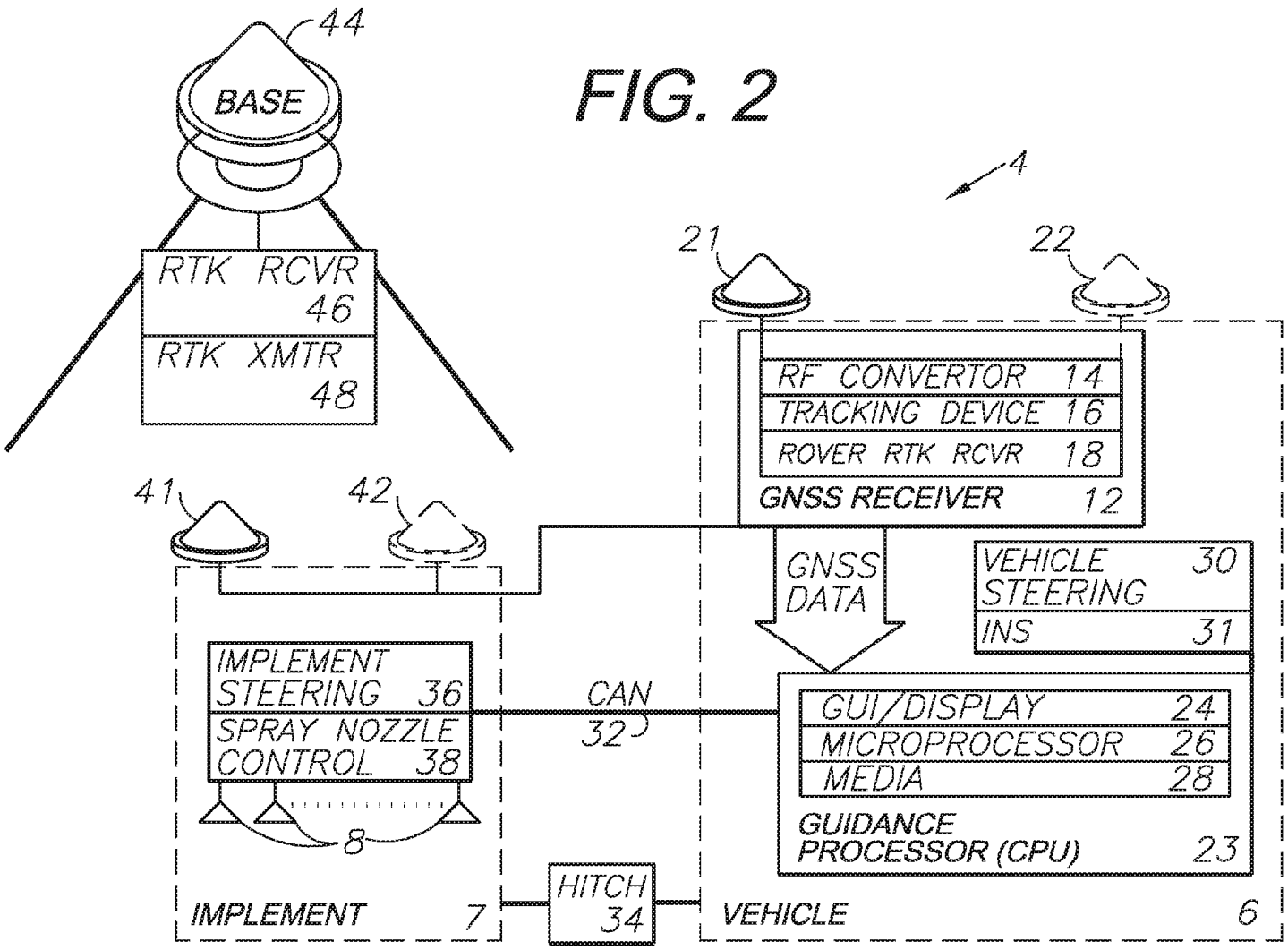
FIG. 2 is a block diagram of a GNSS/INS/RTK tractor and implement system for implementing the raster-based guidance system and method.

FIG. 2 is a schematic block diagram showing the components of the GNSS guidance/control system 4. The tractor 6 components include a GNSS receiver 12 including a first vehicle antenna 21, an optional second vehicle antenna 22, an RF (down) converter 14, a tracking device 16 and an optional rover RTK receiver 18. A guidance processor CPU 23 includes a GUI display 24, a microprocessor 26 and a media storage device 28. Vehicle steering 30 and INS components 31 (e.g., gyroscopes and/or accelerometers) are connected to the guidance processor 23. GNSS-derived data is transferred from the GNSS receiver 12 to the guidance processor CPU 23. The implement 7 can include a first implement antenna 41 and an optional second implement antenna 42, which are connected to the vehicle GNSS receiver 12 and provide GNSS data thereto.

An implement steering subsystem 36 receives steering commands from the guidance processor CPU 23 via a CAN bus 32 or some other suitable connection, which can be wireless. The implement 7 is mechanically connected to the vehicle 6 by a hitch 34, which can be power-driven for active implement positioning in response to implement steering commands, or a conventional mechanical linkage. The hitch 34 can be provided with sensors for determining relative attitudes and orientations between the vehicle 6 and the implement 7. Examples of such an articulated connection and an implement steering system are described in U.S. Pat. Nos. 6,865,465, 7,162,348 and 7,460,942, which are incorporated herein by reference. The implement 8 can comprise any of a wide range of suitable implements, such as planting, cultivating, harvesting and spraying equipment. For example, spraying applications are commonly performed with a boom 5, which can be equipped for automatic, selective control of multiple nozzles 8 and other boom operating characteristics, such as height, material dispensed, etc. By way of example and without limitation, the implement 7 can comprise an agricultural sprayer with a spray nozzle control 38 connected to the guidance processor CPU 23 by the CAN bus 32 for individually controlling the spray nozzles 8.

The GNSS/INS guidance and control system 4 can be configured in various combinations of components and thereby accommodate a wide range of guidance and control operations. For example, RTK guidance can be accommodated with a base 44 including an RTK receiver 46 and an RTK transmitter 48, which can be mounted at a fixed-position reference point in the general vicinity of fields being worked by the equipment 2. Moreover, various combinations of receivers and antennas can be used on the vehicle 6 and/or the implement 7, including single frequency (L1 only) and dual frequency (L1 and L2). Various forms of signal correction can also be utilized, including Satellite Based Augmentation System (SBAS), Wide Area Augmentation System (WAAS) and private subscription services.

Figure 3A:
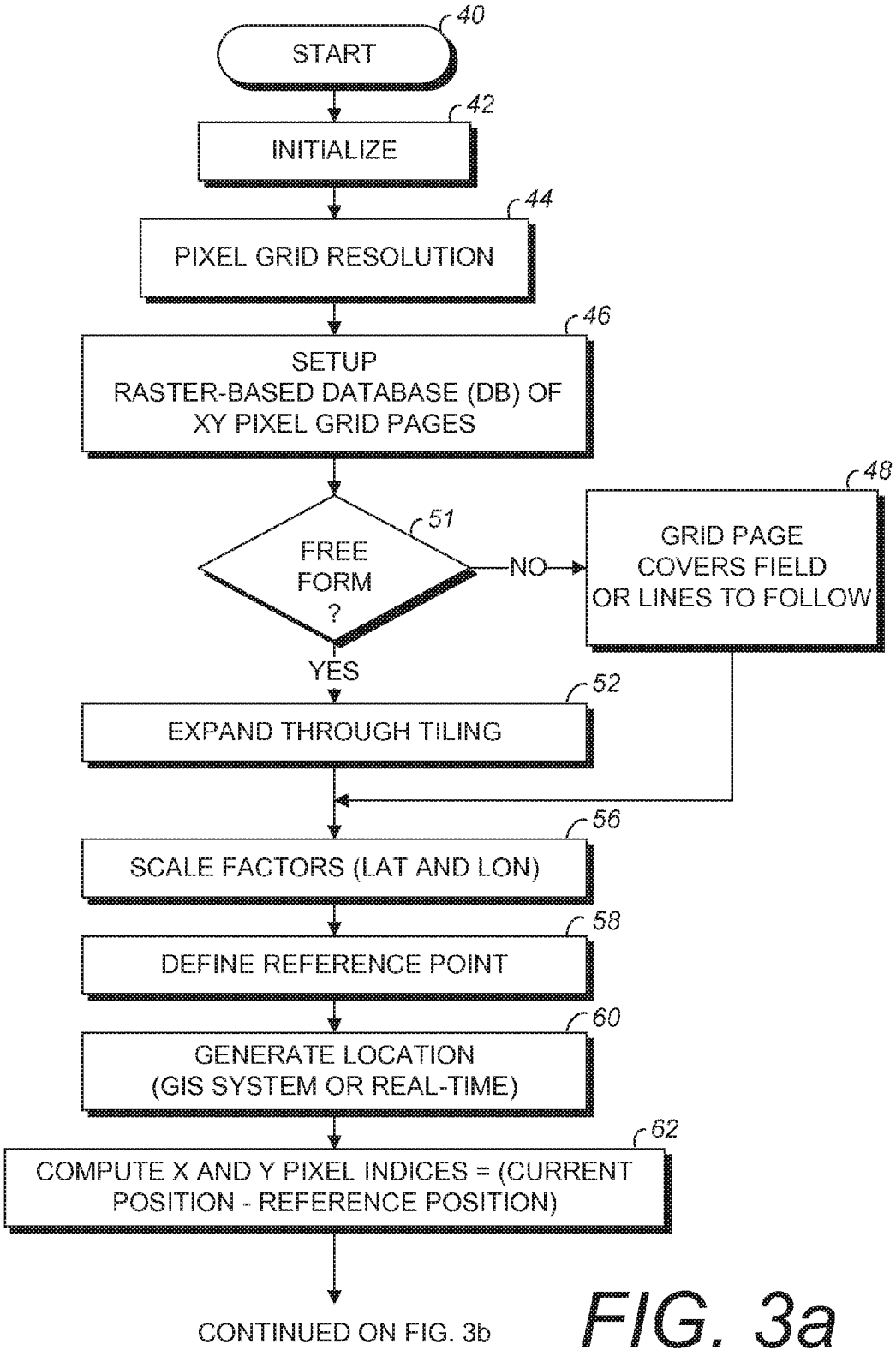
FIGS. 3a and 3b show a flowchart of a raster-based guidance method.
Figure 3B:
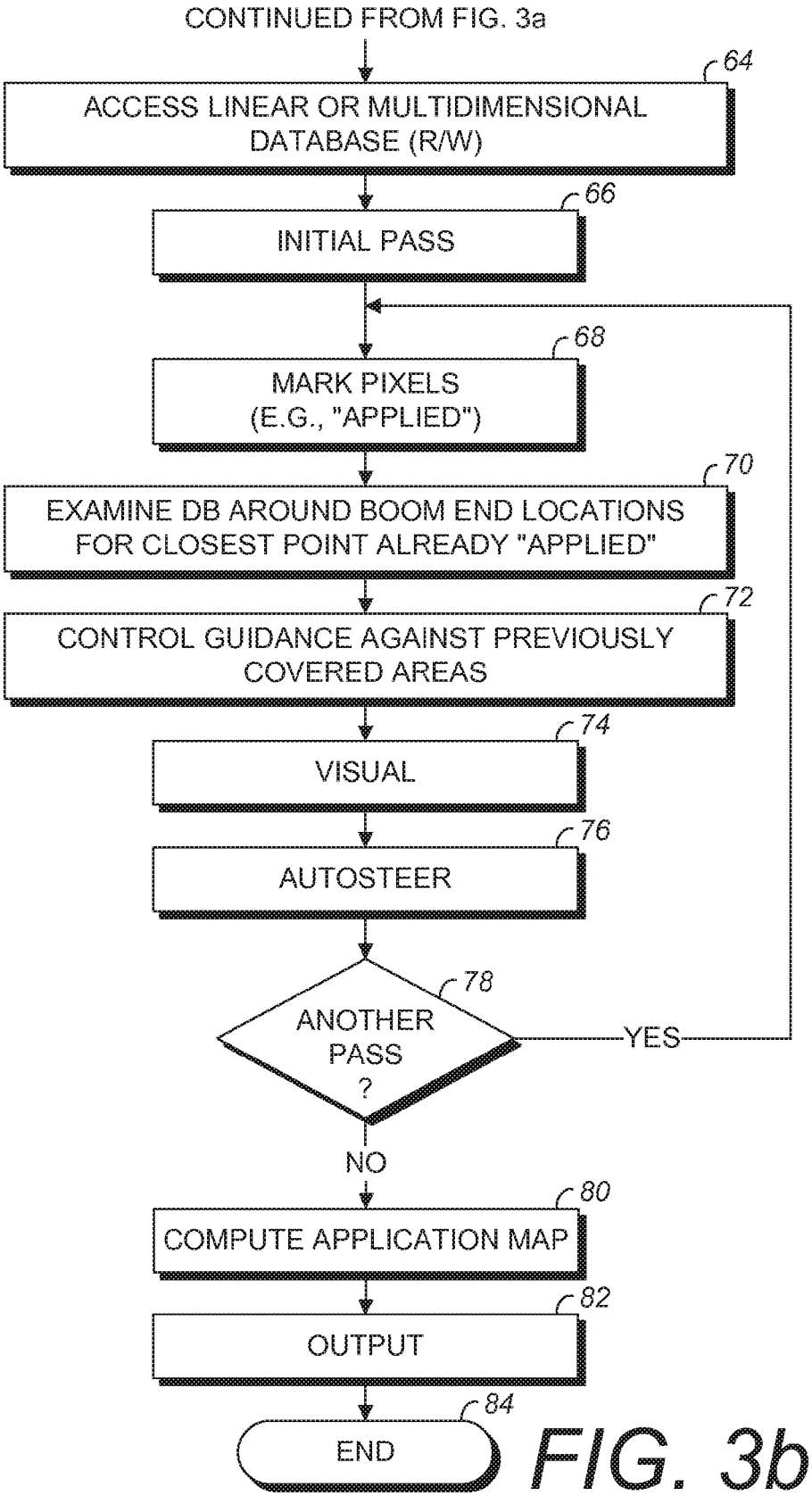

The GNSS receiver 12 disclosed herein can be adapted for various satellite navigational systems, and can utilize a variety of SBAS technologies. Technology is also available for continuing operation through satellite signal interruptions, and can be utilized with the system 4. The antennas 21, 22 can be horizontally aligned transversely with respect to a direction of travel of the tractor 6, i.e. parallel to its transverse X axis. The relative positions of the antennas 21, 22 with respect to each other can thus be processed for determining yaw, i.e. rotation with respect to the vertical Z axis. The INS 31 can include inertial sensors (e.g., gyroscopes and accelerometers) for detecting and measuring inertial movement with respect to the X, Y and Z axes corresponding to yaw, roll and pitch movements in six degrees of freedom. Signals from the receiver 12 and the INS sensors are received and processed by the microprocessor 26 based on how the system 4 is configured and programmed III. Raster-based Guidance and Control Method FIGS. 3a and 3b show a method of raster-based guidance and control according to an aspect of the present invention. From a start 40 the system 4 is initialized at 42, including setting a pixel grid resolution at 44. Without limitation, pixel grid resolution in the approximate range of 0.05 meters to 5 meters can be useful for various operations, depending on the desired accuracy.

Setup of a raster-based database (DB) of XY pixel grid pages 48 occurs at 46. An example of a pixel grid page 48 is shown in FIG. 1 and includes multiple pixels 50. Pixel grid pages can cover entire fields, or, alternatively from decision box 51, can be freeform and automatically expandable in any direction through a tiling method at step 52. [An] *In an example, the tiling method, applied to a system including a vehicle having motive and working components that are guidable over an area being treated by the working component, may include: providing an XY pixel grid corresponding to the area; providing a raster-based database page comprising said XY pixel grid for said area; defining additional raster-based XY pixel grid pages in said area; and expanding said database by tiling said pixel grid pages over said area. Referring now to block 48, an* exemplary preferred method is to use a rectangular grid based on WGS 84 comprising GPS-based coordinates for generating a grid page at 48. Scale factors for latitude and longitude are set at 56 and an initial reference point is defined at 58. A location in the grid area can be generated at 60 on a GIS system, such as the Map Star™ program available from Hemisphere GPS of Calgary, Alberta, Canada, or in real-time in the field on the guidance system 4. Locations in the grid area are defined by the number of pixels east-west (EW) and north-south (NS) from the reference location at 62. A linear or multidimensional database is accessed at 64 using the XY pixel indices computed at 62. The database can be accessed and read and/or written to (R/W) at 64. *In an example, a method may include: creating with said processor a linear or multidimensional database comprising said pixel grid pages; accessing with said processor said database; marking pixels in said database as treated; and guiding said vehicle using said treated pixel markings.*

In an exemplary field spraying operation using the sprayer 7, the equipment 2 is driven in an initial pass at 66 in a "swath" mode with its swath width comprising one of the operating parameters whereby all pixels covered by the spray boom 5 are marked as "applied" (50a in FIG. 1) at step 68. On a subsequent adjacent pass, the database around the spray boom end locations is examined for the closest applied pixel 50a at 70, which is designated 50d (tested and applied) in FIG. 1, and is then used for instantaneous guidance control at 72, either through a visual GUI at 74 and/or an autosteering function at 76.

As shown in FIG. 1, the operator can thereby drive against previously covered (applied) pixels 50a. The database can be programmed for "unapplied" 50e and "applied" 50a pixel status conditions. Other pixel status conditions can include "vehicle track" 50b, "unapplied test" 50c, "applied test" 50d, "unapplied" 50e, "under-applied" 50f and "over-applied" 50g (FIG. 1). The process continues via a loop through the "another pass" decision box 78 until complete or interrupted, whereafter an application map showing database values, pixel status, equipment positions and headings is computed at 80 and output at 82 with the operation ending at 84.

Figure 4:
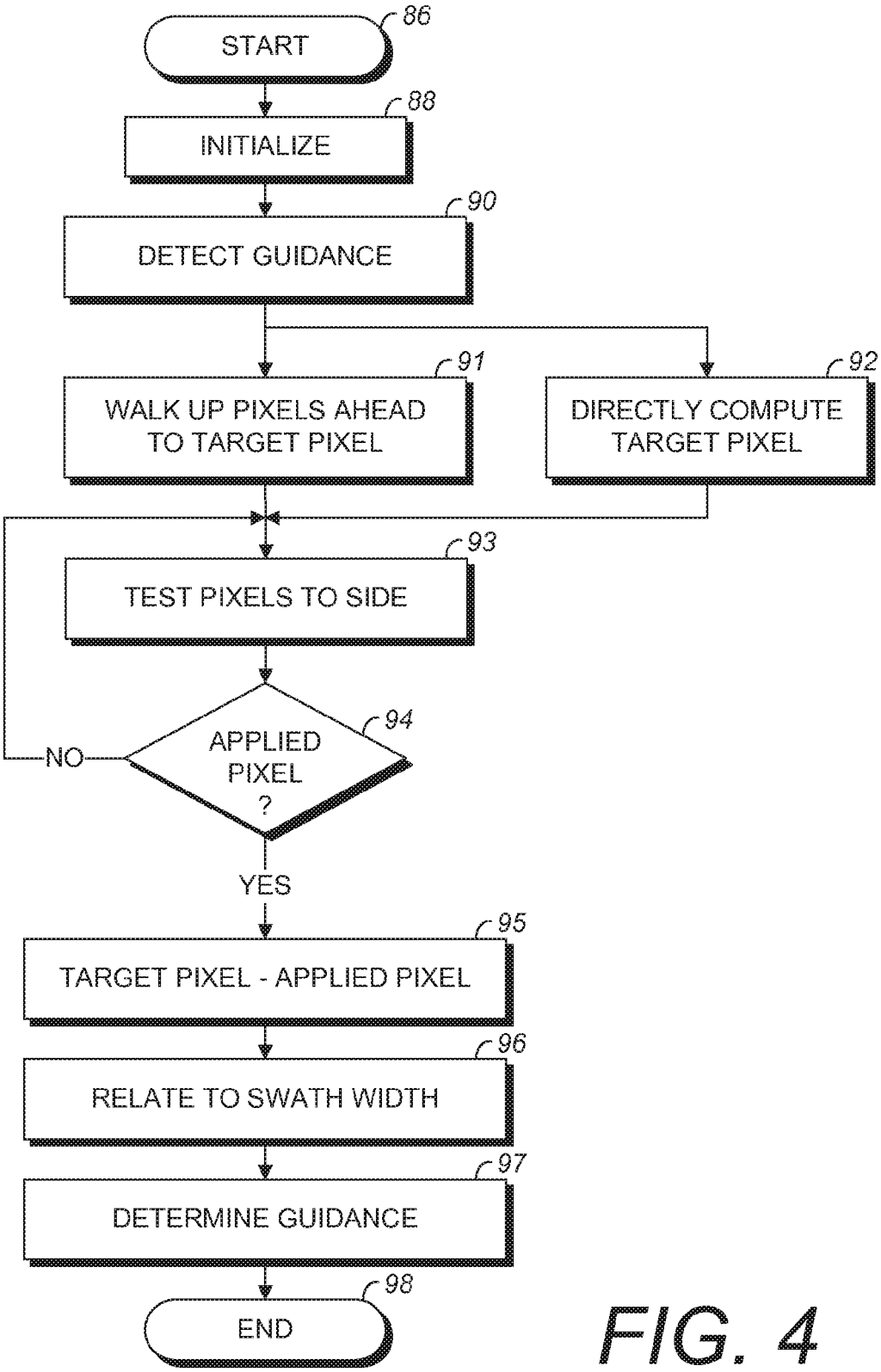
FIG. 4 is a flowchart of another aspect of the raster-based guidance method using target pixels.

FIG. 4 shows another method of guidance using the vehicle 6 location, swath (e.g., spray boom 5) width and direction of travel. From start 86, initialize 88 and detect guidance 90, vehicle track/target pixels 50b (FIG. 1) ahead of the equipment 2 are "walked up" from the center of the vehicle 6 to a *target pixel* point ahead using either a Bresenham-type algorithm at 91 or by directly computing a track/target pixel 50b ahead at 92. Then the unapplied test pixels 50c to the side of the track/target pixel 50b are tested for "applied" status at 93. Upon detecting an applied test pixel 50d at 94, its distance away from the track/target pixel 50b relative to the implement swath width (i.e. "offset" generally equal to half of the swath width) is obtained at 95, related to swath width at 96, used to determine guidance at 97 and the method ends at 98.

Figure 5:
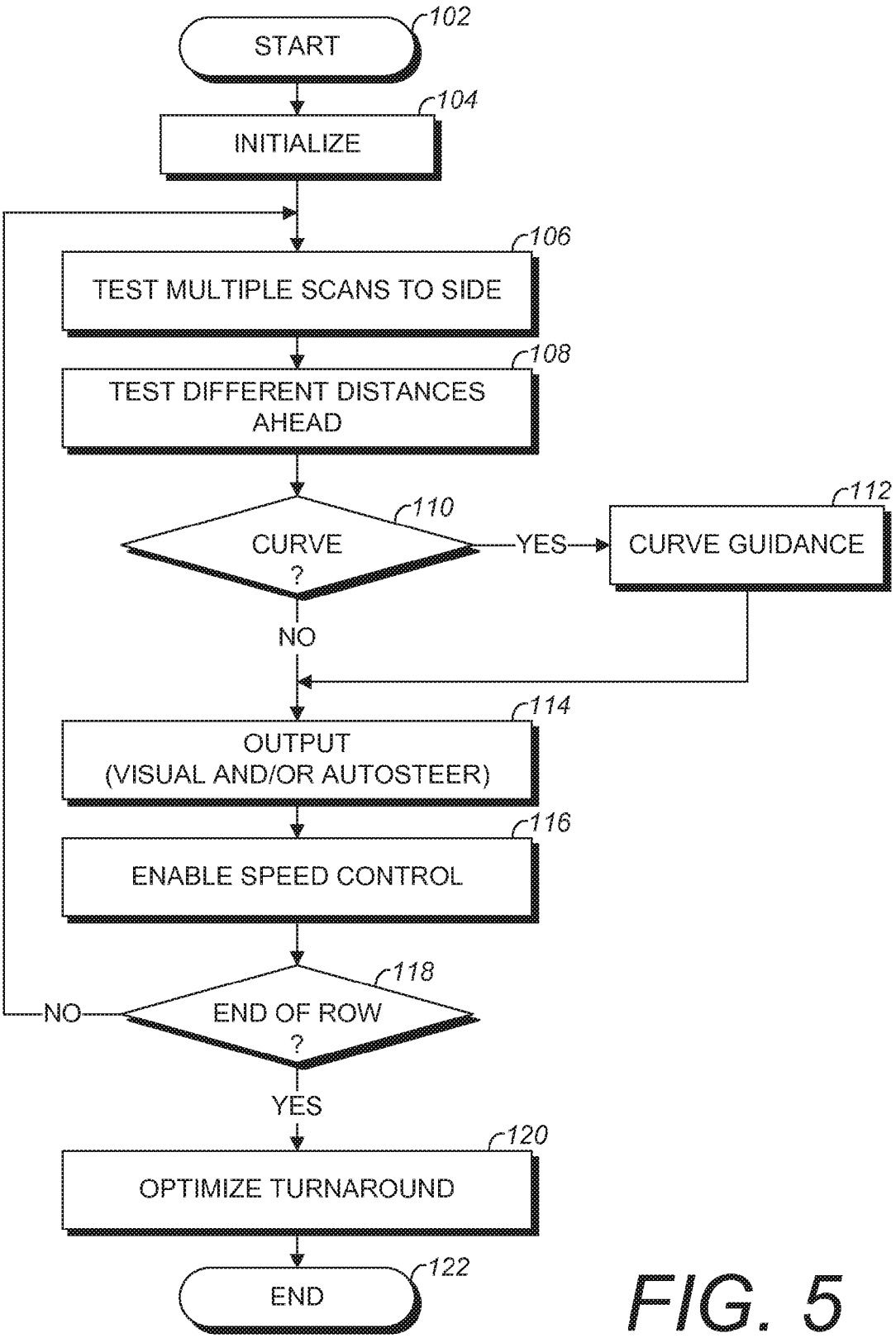
FIG. 5 is a flowchart of another aspect of the raster-based guidance method.

As shown in FIG. 5, a similar method can be used for computing guidance using two dimensions (2D). From start 102 and initialize 104, multiple scans to the side of the vehicle and different distances ahead of it are tested at 106, 108 respectively to detect previously-applied areas along curves at 110 and to implement curve guidance at 112. The output can be provided visually via a GUI 24 and/or used in an autosteering algorithm at 114. Speed control at 116 and end-of-row turnaround at 118, 120 can be enabled and optimized. The method ends at 122.

Figure 6:
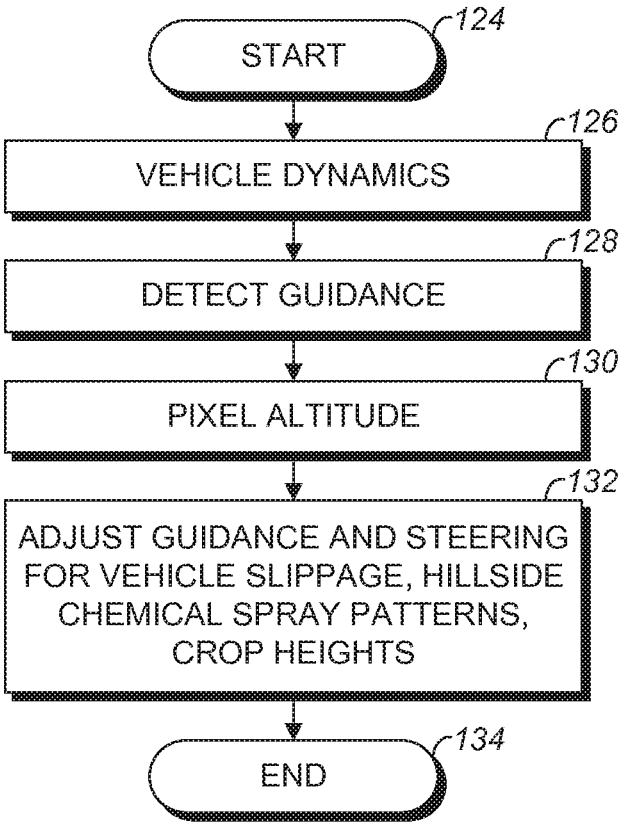
FIG. 6 is a flowchart of another aspect of the raster-based guidance method.

FIG. 6 shows a variation comprising a 3D method using the altitudes of the different pixels for adjusting guidance and steering. From a start 124 vehicle dynamics are input as operating parameters at 126, guidance is detected at 128 and pixel altitudes are input at 130. For example, the method can compensate by remaining closer to the applied area to adjust for vehicle downhill slippage and hillside chemical spray patterns at 132. Such 3D information can also correspond to crop heights with the system making suitable adjustments, also at 132. The method ends at 134.

Figure 7:
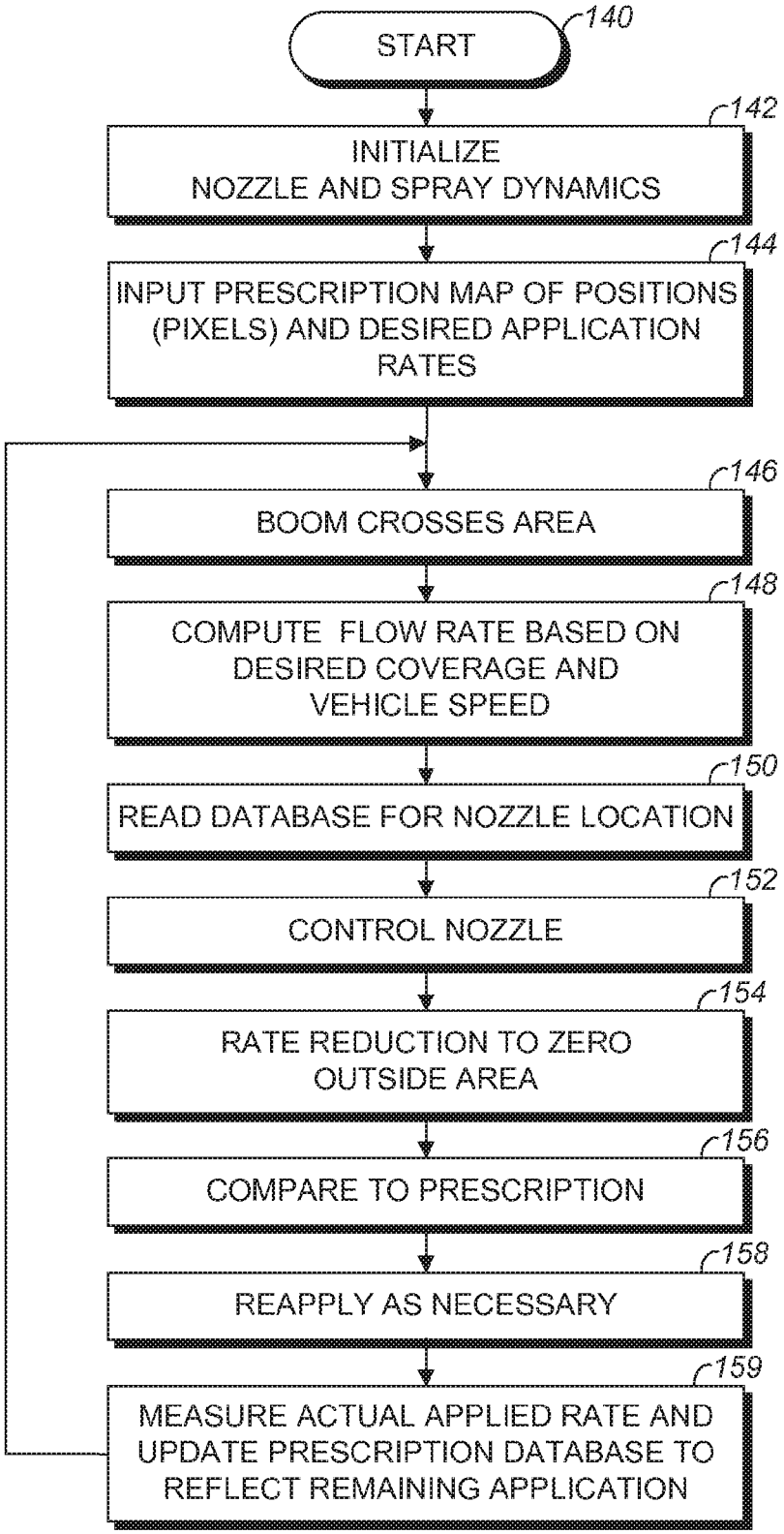
FIG. 7 is a flowchart of another aspect of the raster-based guidance method including spray nozzle control.

FIG. 7 shows another method of the invention involving sprayer nozzle control. From a start 140 the nozzle and spray dynamics are initialized at 142. A chemical spray prescription map including the positions represented by pixels and target chemical application rates (e.g. gallons per acre) is input at 144. Operation commences as the spray boom crosses an area at 146 and flow rate is computed based on desired coverage (i.e. prescription database value) and vehicle speed at 148. The database is read for the locations of the spray nozzles at 150 whereby their pixel-defined locations are used for determining chemical applications and nozzle control at 152. At 154 the dispensing rate for one or more of the nozzles 8 is reduced to zero if the equipment 2 travels outside the predetermined application area, e.g., field 10. A comparison with the prescription occurs at 156 followed by reapplication as necessary at 158 followed by measure actual applied rate and update prescription database to reflect remaining application at 159 followed by a loop back to 146. The process shown in FIG. 7 is continuous in the sense that the operator can start and stop at any time and the sprayer will only dispense when located over a pixel 50 with a non-zero prescription database value. Thus, the field 50 is completely treated when all of its pixels 50 have zero prescription database values, and the system will no longer dispense.

In conjunction with the methods described above, variable rate control can be accomplished using multiple channels for individual nozzle control of chemical applications. For example, the CAN bus 32 communicates individual nozzle control commands from the processor 23 to the spray nozzles 8, which can be monitored and boom pressure controlled thereby for correct calibration. Individual nozzle flow rate control across the entire spray boom accommodates swath overlaps whereby spray nozzle output would be reduced or shut off. Nozzles 8 can also be shut off upon entry into previously-applied areas and no-spray areas, such as outside the field boundaries.

The pixel status in the method of the present invention includes information on the chemical(s) application rates(s). As the spray boom 5 crosses the treatment area the database is read for each nozzle 8 location and the desired rates per area, e.g. gallons per acre. The nozzle flow rate is then adjusted to the required output, e.g., in gallons per minute (GPM) based on the current nozzle speed. The amount of coverage during turning of the vehicle can also vary according to the nozzle locations in the turn, with the outermost nozzle 8 traveling fastest (requiring the greatest flow rate) and the innermost nozzle traveling slowest (requiring the least flow rate). Such speeds can vary considerably in turns and are accommodated by the system 4.

Alternative algorithms can be utilized for managing chemical application. For example, in a "rate reduction to zero" algorithm the application rates can be progressively reduced on one or more passes as required to "zero out" the applied material quantities across the boom widths whereby on subsequent passes the applied rate will be zero gallons per acre. Alternatively, in an "as applied map" algorithm the application rates can be read back in real time from the processor 23 and subtracted from the desired target rate per pixel and written back as the remaining desired rates with a flag indicating partial application marking the partially-treated (under-applied) pixels 50f. The real time database display reflects the remaining rates required for each pixel, the remaining chemical required for the completion of the field area and the remaining quantities available.

Various output information can be provided to an operator, e.g., indicating pixel status originally and currently, "as applied" mapping and remaining chemical application rates by pixel for job completion. By individually controlling the flow rates at the nozzles 8, the desired prescription map area rate can be achieved, thereby optimizing variable rate coverage for increased crop production. Less-experienced operators can be accommodated because the system 4 reduces the likelihood of over-application or application outside the field perimeter.

Figure 8A:
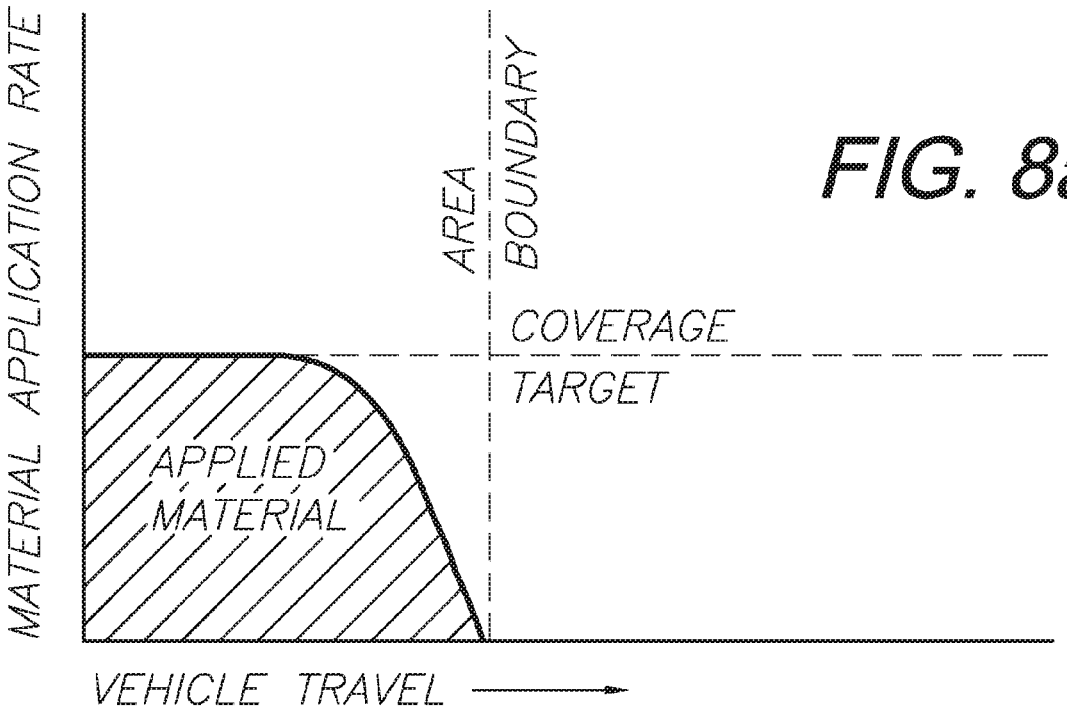
FIG. 8a is a diagram of material application parameters on exiting a treated area.
Figure 8B:
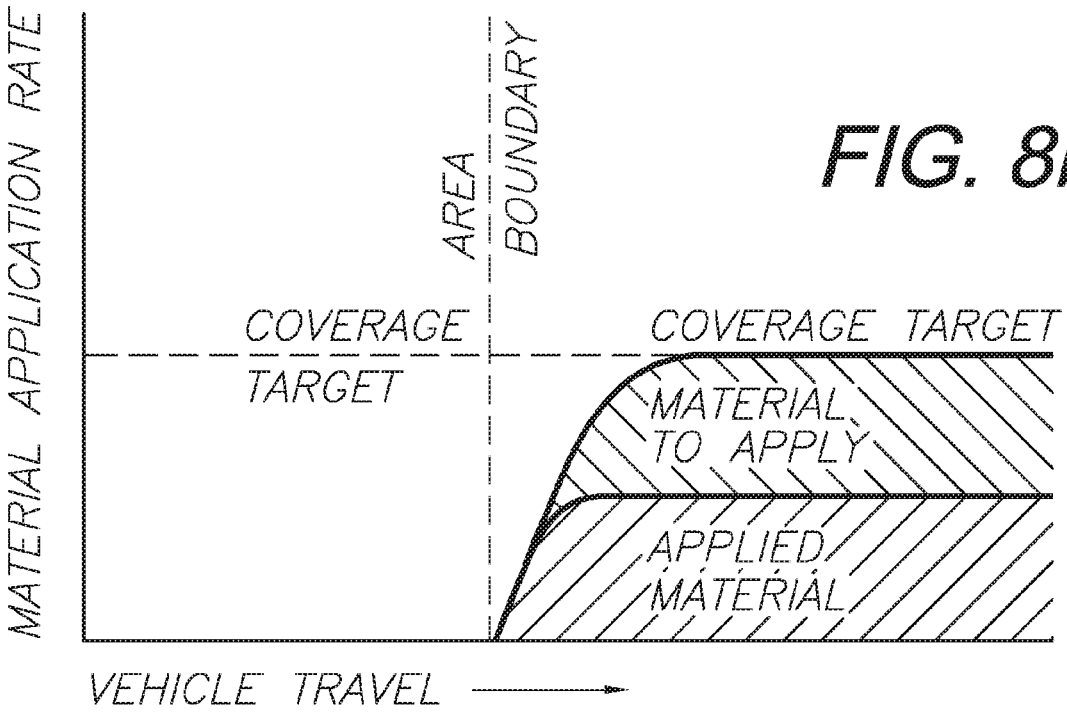
FIG. 8b is another diagram of material application parameters on entering an area to be treated.

FIGS. 8a and 8b show conditions encountered at field perimeters (i.e. area boundaries). FIG. 8a shows a preemptive shut off as the vehicle approaches the area boundary. Programming the system 4 with such "look-ahead" capabilities can prevent chemical application beyond the area boundary. FIG. 8b shows commencing application upon entering a coverage area, which can occur in phases with a first applied material quantity, from which the remaining quantity of material to be applied can be determined in order to achieve the target chemical application.

It is to be understood that the invention can be embodied in various forms, and is not to be limited to the examples discussed above.

What is claimed and desired to be secured by Letters Patent is as follows:

[1. A method of guiding an agriculture sprayer vehicle including a motive component and a spray component with a spray boom having opposite ends and multiple spray nozzles mounted in spaced relation between said ends, said components being interconnected by a power hitch adapted for laterally shifting said working component relative to said motive component, which method comprises the steps of:

providing an XY pixel grid corresponding to the area;

providing a raster-based database page comprising said XY pixel grid for said area;

providing a processor on the vehicle;

providing a GNSS guidance system connected to the processor on the vehicle;

receiving GNSS positioning signals with said guidance system;

providing said GNSS positioning signals as input to said processor;

computing GNSS-based positioning for said vehicle with said processor;

defining a GNSS-defined reference point on said area and storing the reference point coordinates with said processor;

computing X and Y pixel indices based on said GNSS-defined vehicle position in relation to said reference point with said processor;

treating portions of said area with said working component;

with said processor marking pixels in said treated area portions as treated;

guiding said vehicle over said area utilizing said treated pixel information;

defining additional raster-based XY pixel grid pages in said area;

expanding said database by tiling said pixel grid pages over said area;

generating X and Y scale factors for said database;

relating said X and Y scale factors to latitude and longitude respectively;

computing X and Y pixel indices based on the difference between current GNSS-defined position coordinates and the reference position coordinates;

creating with said processor a linear or multidimensional database comprising said pixel grid pages;

accessing with said processor said database;

marking pixels in said database as treated;

defining a swath coverage area with said working component ends forming opposite edges of said swath;

with said GNSS system and said processor seeking pixels in proximity to said swath edges;

with said GNSS system and said processor guiding said vehicle along said swath edges;

providing an autosteer system on said vehicle;

with said processor generating steering commands using the marked pixel information and said XY pixel page database;

outputting said steering commands to said autosteer system for automatically steering said vehicle over said area;

with said processor and said GNSS system laterally shifting said working component relative to said motive component for maintaining said working component generally within said swath;

computing an application map for said area corresponding to treatments of pixels therein with said working component;

guiding said vehicle with said application map while treating said pixels; and detecting a vehicle direction of travel with said GNSS system;

walking up the pixels in the vehicle direction of travel to a target pixel;

testing pixels in multiple scans alongside said vehicle path for treated conditions based on a swath width of said working component;

guiding said vehicle towards said target pixel using said treated condition pixel information alongside said vehicle path;

testing multiple distances ahead for treated pixels;

detecting a curve condition defined by treated pixels;

guiding said vehicle alongside said curve using said treated pixel information;

preprogramming said processor with variables corresponding to vehicle performance dynamics;

determining altitudes of said pixels with said GNSS system; and adjusting guidance and steering for vehicle slippage, sloping surface chemical spray patterns and crop heights using said vehicle performance dynamics and said pixel altitudes.]

*2. A memory storing instructions that, when executed by at least one processing device of an agriculture vehicle that includes a motive component and a working component, cause the at least one processor to perform operations including:*

*providing an XY pixel grid page corresponding to an area, the grid page including pixels associated with different portions of the area;*

*guiding the agricultural vehicle in an initial pass over the area corresponding to the grid page;*

*during the initial pass of the area, marking the pixels in the XY pixel grid page associated with portions of the area treated by the working component as applied pixels;*

*during another pass of the area, detecting a vehicle path with at least one sensor of the vehicle;*

*walking up pixels in the XY pixel grid page along the vehicle path to a target pixel in the XY pixel grid page;*

*testing the pixels in the XY pixel grid page alongside the vehicle path for the applied pixels based on a swath width of the working component; and*

*guiding the vehicle towards the target pixel based on applied pixels identified alongside the vehicle path.*

*3. The memory of claim 2, wherein the operations further include:*

*testing multiple distances ahead for the applied pixels;*

*detecting a curve defined by the applied pixels; and*

*guiding the vehicle alongside the curve defined by the applied pixels.*

*4. The memory of claim 2, wherein the operations further include:*

*determining altitudes for the identified portions of the area;*

*assigning the altitudes to the pixels associated with the identified portions of the area; and*

*adjusting guidance and steering of the vehicle based on the altitudes assigned to the pixels associated with the portions of the area covered by the working component.*

*5. The memory of claim 2, wherein the operations further include:*

*defining additional XY pixel grid pages; and*

*combining the additional XY pixel grid pages with the provided XY pixel grid page.*

*6. The memory of claim 2, wherein the operations further include:*

*identifying a swath coverage area with swatch edges corresponding with opposite ends of the working component;*

*identifying the pixels in proximity to the swath edges; and*

*steering the vehicle based on the pixels in proximity to the swath edges.*

*7. The memory of claim 2, wherein the operations further include:*

*assigning chemical prescription rate values to the pixels;*

*compute amounts of a chemical applied to the portions of the area;*

*compare the amounts of the chemical applied to the portions of the area with the target chemical prescription rate values assigned to the pixels associated with the portions of the area; and*

*adjusting the amounts of additional chemical output from individual spray nozzles of the working component on the portions of the area based on the comparisons of the amounts of the chemical previously applied to the portions of the area and the chemical prescription rate values assigned to the pixels associated with the portions of the areas.*

*8. The memory of claim 2, wherein the operations further include detecting and measuring inertial movement using a gyroscope and accelerometer on the vehicle.*

*9. A method of operating an agriculture vehicle that includes a motive component and a working component, the method comprising:*

*providing an XY pixel grid page corresponding to an area, the grid page including pixels associated with different portions of the area;*

*guiding the agricultural vehicle in an initial pass over the area corresponding to the grid page;*

*during the initial pass of the area, marking the pixels in the XY pixel grid page associated with portions of the area treated by the working component as applied pixels;*

*during another pass of the area, detecting a vehicle path with at least one sensor of the vehicle;*

*walking up pixels in the XY pixel grid page along the vehicle path to a target pixel in the XY pixel grid page;*

*testing the pixels in the XY pixel grid page alongside the vehicle path for the applied pixels based on a swath width of the working component; and*

*guiding the vehicle towards the target pixel based on applied pixels identified alongside the vehicle path.*

*10. The method of claim 9, further comprising:*

*testing multiple distances ahead for the applied pixels;*

*detecting a curve defined by the applied pixels; and*

*guiding the vehicle alongside the curve defined by the applied pixels.*

*11. The method of claim 9, further comprising:*

*determining altitudes for the identified portions of the area;*

*assigning the altitudes to the pixels associated with the identified portions of the area; and*

*adjusting guidance and steering of the vehicle based on the altitudes assigned to the pixels associated with the portions of the area covered by the working component.*

*12. The method of claim 9, further comprising:*

*defining additional XY pixel grid pages; and*

*combining the additional XY pixel grid pages with the provided XY pixel grid page.*

*13. The method of claim 9, further comprising:*

*identifying a swath coverage area with swatch edges corresponding with opposite ends of the working component;*

*identifying the pixels in proximity to the swath edges; and*

*steering the vehicle based on the pixels in proximity to the swath edges.*

*14. The method of claim 9, further comprising:*

*assigning chemical prescription rate values to the pixels;*

*compute amounts of a chemical applied to the portions of the area;*

*compare the amounts of the chemical applied to the portions of the area with the target chemical prescription rate values assigned to the pixels associated with the portions of the area; and*

*adjusting the amounts of additional chemical output from individual spray nozzles of the working component on the portions of the area based on the comparisons of the amounts of the chemical previously applied to the portions of the area and the chemical prescription rate values assigned to the pixels associated with the portions of the areas.*

*15. The method of claim 9, further comprising detecting and measuring inertial movement using a gyroscope and accelerometer on the vehicle.*

* * * * *